May 5, 1931. W. W. HALE 1,804,335
SANDWICH BAKER
Filed April 1, 1929　3 Sheets-Sheet 1
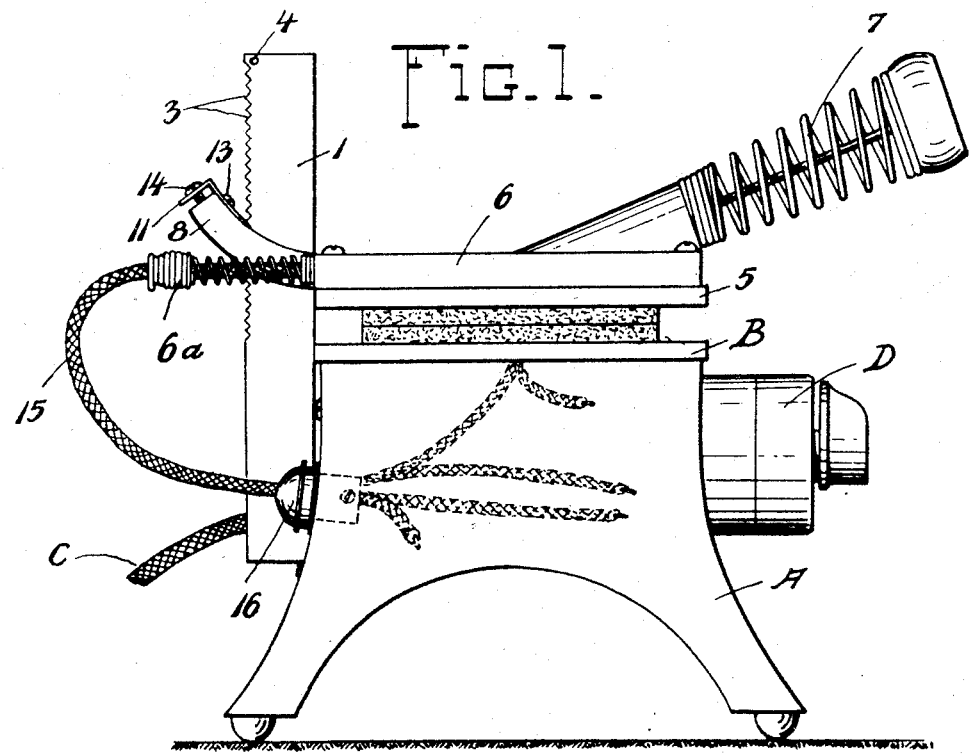
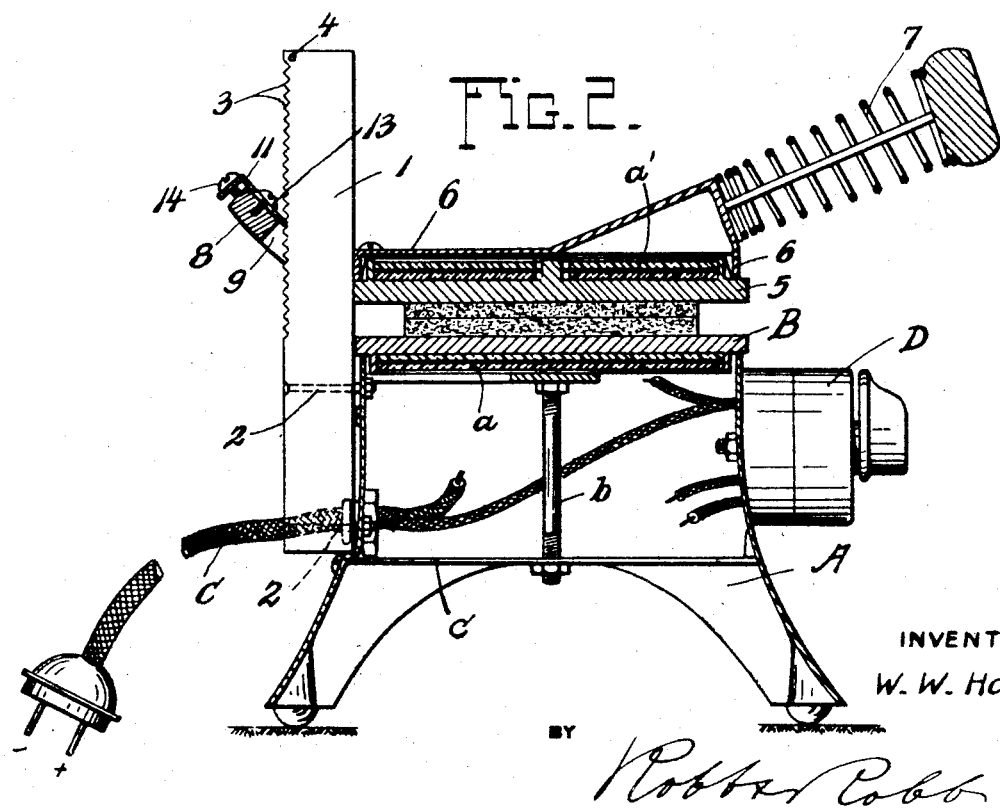
INVENTOR
W. W. Hale.
BY Robb & Robb
ATTORNEYS May 5, 1931.  W. W. HALE  1,804,335
SANDWICH BAKER
Filed April 1, 1929  3 Sheets-Sheet 2
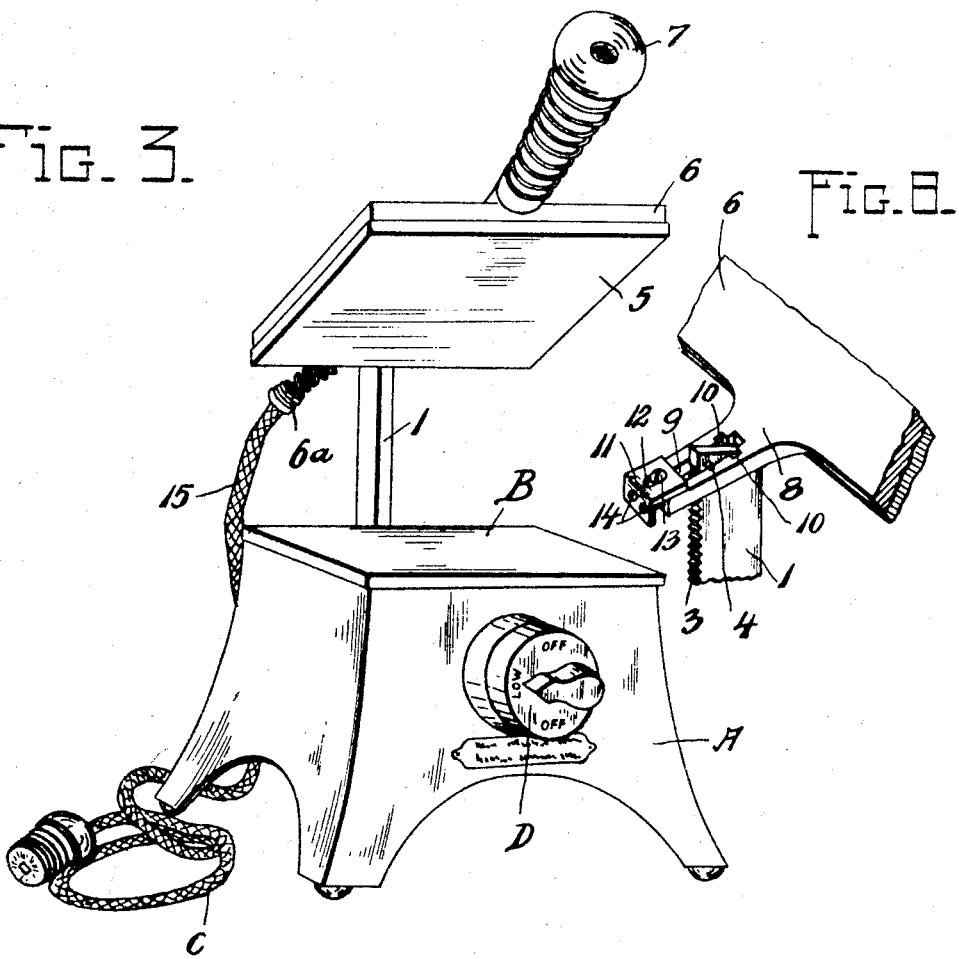
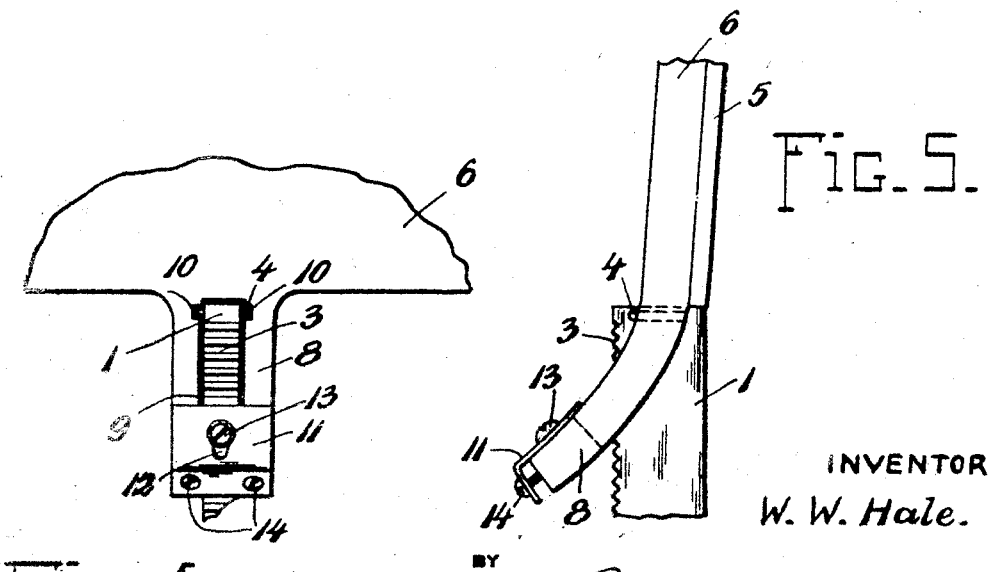
INVENTOR
W. W. Hale.
BY
Robert Cobb
ATTORNEYS

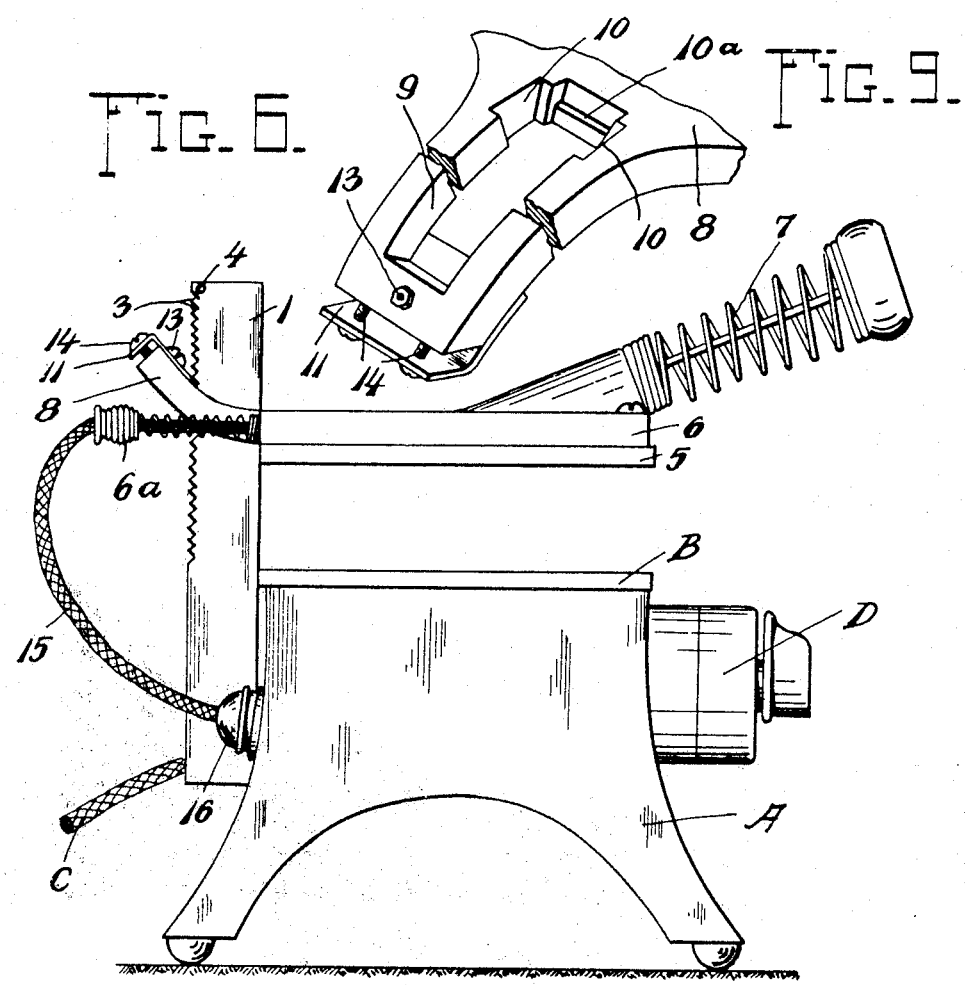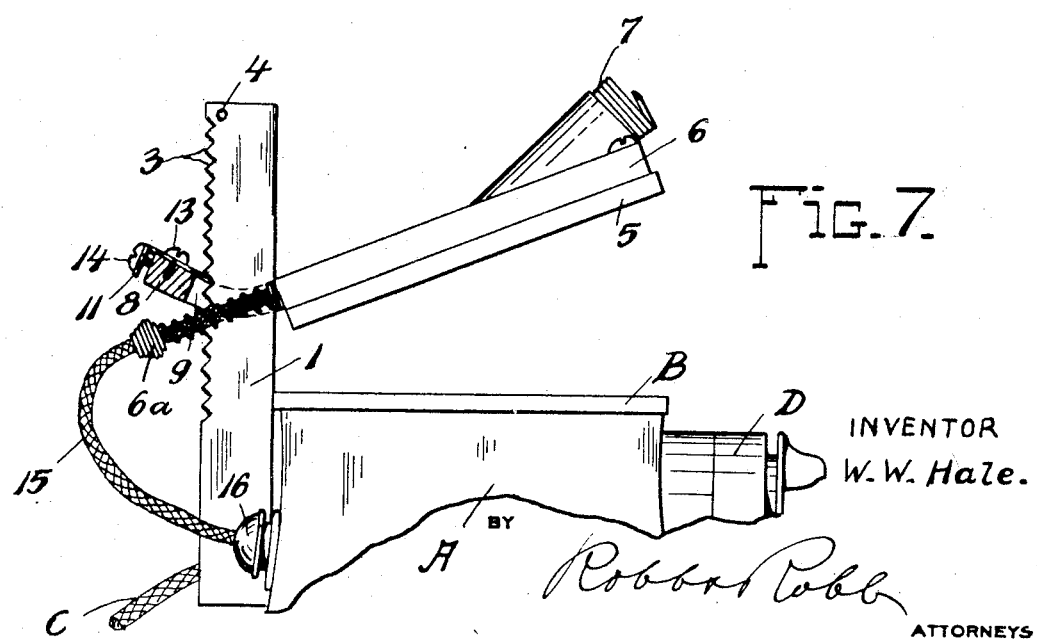

Patented May 5, 1931

1,804,335

UNITED STATES PATENT OFFICE

WILLIS W. HALE, OF CLEVELAND, OHIO

SANDWICH BAKER

Application filed April 1, 1929. Serial No. 351,707.

This invention has relation to electrical appliances of that type now commonly known today as sandwich bakers, and the principal objects of the invention have been to devise an appliance of this kind, primarily designed for the toasting of bread assembled into sandwich form, which appliance is relatively simple in its construction, so as to easily operate under practical conditions of service, and especially built to handle the sandwich or sandwiches for efficient toasting thereof.

With the last mentioned object in view, my sandwich baker involves a peculiarly mounted baking plate, which is the upper of two of such plates forming a part of the device, said upper baking plate being mounted in an adjustable manner relatively to the lower baking plate so as to readily accommodate for the toasting of sandwiches of different thicknesses, in addition to which the said mounting of the upper baking plate is such, that when this plate is caused to bear down upon the upper piece of bread of a sandwich, it has a tendency to self adjustment by reason of a sort of floating relation to the lower baking plate, and will thus additionally accommodate itself to the form of the article of food that is being treated.

In the practical use of sandwich bakers, it is proper to note that the sandwich comprising the upper and lower pieces of bread and different kinds of spreads or meats, disposed between the pieces of bread, is placed bodily upon the baker, and preferably upon the lower baking plate, usually provided. Then the upper baking plate by suitable manipulation one way or another, is caused to move down upon the sandwich so that the latter is practically clamped, to some extent, between the two baking plates to which the heat is applied, and which do the toasting work.

Bearing in mind the requirements of a sandwich baker of this type, I have designed my appliance so that the upper baking plate is equipped with handle means and readily manipulated to be supported in any desired position of adjustment so far as the thickness of the sandwich is concerned, for effective baking action, locking means being provided to lock the said baking plate in its adjusted position after manipulation.

Moreover, the special means provided for connecting my upper baking plate with a suitable standard on the base of the machine, enables the plate to be lifted to a maximum distance, and quickly positioned out of use, or in what might be called an inoperative position that facilitates the entering of a fresh sandwich or the removal of the previously toasted sandwich. Or, the said upper baking plate may be thus positioned inoperatively as when the appliance is not being used at all.

With the foregoing features of construction in mind, the details enabling the attainment of objectives of my invention, will be readily understood upon reference to the following description, and the accompanying drawings, in which:

Figure 1 is a side elevation of a sandwich baker embodying my invention.

Figure 2 is a vertical sectional view showing much the same parts of construction as illustrated in Figure 1.

Figure 3 is a perspective view of the baker with the upper baking plate at the maximum of its upward movement as when out of use or temporarily inactive.

Figure 4 is a fragmentary rear view of the upper portion of the supporting standard, and the interengaging means between it and the upper baking plate.

Figure 5 is a side view of the parts, particularly shown in Figure 4, and broken away.

Figure 6 is a side view showing the upper baking plate supported in a horizontal inactive position or a position in which it may be used for baking an extra thick article of food, or sandwich.

Figure 7 is a side view largely fragmentary so far as the base of the appliance is concerned, but showing the disposition of the upper baking plate in the operation of lifting it so that it slides freely up the standard or down, dependent upon the adjustment desired to be obtained.

Figure 8 is a view illustrating the upper baking plate in the position assumed thereby, when inoperative as at the time of introducing a sandwich between the upper and lower baking plates.

Figure 9 is an enlarged detail perspective view looking upwardly at the loop, or keeper.

I describe the particular and preferred construction of my invention as shown in the drawings, as follows. The heating appliance, generally speaking, includes a suitable base A which may include legs or feet to rest upon a suitable support such as a table. This base is of single formation, as shown in the drawings, but it might be of elongated formation so as to cooperate with a series of upper baking plates, instead of a single one as depicted in the illustration accompanying this description.

The base A is provided with a lower baking plate B, and the upper portion of the base provides a hollow chamber containing a heating element $a$ of any suitable type supplied with electric current by main leads C running to a switch D, which supplies current in varying amounts to the heating element $a$, in quite the usual way. The heating element is held in place on the base A, by a suitable connecting bolt $b$ which passes through a bottom plate $c$, all of which is fairly clearly shown in Figure 2.

Extending upwardly from the rear of the base structure A, that carries the lower baking plate B, is a vertical standard 1, the rear edge or side of which is notched at 3, said standard being suitably rigidly attached to the base by a screw bolt 2 or any similar means. The upper baking plate is designated 5 and embodies a casing element 6 secured thereto by screws and enclosing the upper heating element $a'$, seen best in Figure 2.

Heat is supplied to this upper heating element $a'$ by a lead-in wire, resiliently coupled to the casing part 6 as at $6a$, and having a plug socket connection as at 16, for connecting it with the main line wires through the means of the switch D. Projecting forwardly from the casing element 6 on the upper baking plate 5 is a handle 7 for manipulation of said plate. Extending rearwardly from and integral with the casing element 6 is a loop member 8 which might be otherwise characterized as a slotted curved lug, the slot 9 of which is formed so as to receive the standard 1 therein in a loose and free manner, so that the baking plate 5 is free to have a sort of floating movement in that it can rock sidewards or rock slightly from the front to the rear and yet be substantially held in place at an adjustment when the front edge of the engaging plate 11 secured to the loop member 8 engages one of the teeth of the standard 1.

Practically speaking, the standard 1 is a sort of rack, and the engaging plate 11 is of hardened metal so that it will stand a very considerable amount of wear. The plate 11 is formed with a slot in its body through which passes a screw 13, which screw permits of slight forward adjustment of the plate for the purpose of taking whatever wear may be created, there being rear screws 14 carried by the rear flange of the plate 11 for abutment with the rear end of the loop 8 to assist in the adjustment of said plate 11 relatively to the loop and the toothed portion of the standard 1.

The slot 9 in the loop is peculiarly formed with an enlargement 10 at its portion adjacent to the front side of the standard 1, said enlargement being best shown in Figure 9. The under side of the loop or keeper, at its front portion just forwardly of the enlargement 10, is undercut to a slight degree, thereby forming a seat $10a$. A cross pin 4 projects through the standard 1 at its upper and rear corner, these projections extending sufficiently to engage the upper sides of the loop or keeper upon upward movement of the upper plate, but permitting the passage of the enlargement 10 thereover. In the ordinary use of the appliance, the pin 4 limits the upward movement of the upper baking plate 5.

The foregoing largely represents the constructional form of my invention, and the manner in which the features above described are taken advantage of, will now be set forth.

In the ordinary use of my appliance, the upper baking plate will be adjusted so as to be supported in the positions shown in Figures 3 and 8, the seat $10a$ of the loop 8 resting on the upper inner corner portion of the standard 1, and the plate being prevented from downward movement by the abutting relation of the pin 4 having its ends engaging the upper side of the loop 8.

With the parts thus arranged, the user of my appliance is able to readily insert the sandwich or other article of food to be cooked or treated, in the space between the two baking plates. Thereupon, by using the handle 7, the baking plate 5 may be pulled forwardly and dropped until it assumes a position substantially as shown in Figure 1, or in Figure 6, the action of moving it down being somewhat depicted by Figure 7, showing the adjustment of the plate or position assumed by it, permitting its free downward movement. When the upper baking plate 5 contacts with the article of food or sandwich, the operator pulls it forward slightly so as to interengage the teeth 3 and the hardened plate 11 that is virtually a tooth adjustably mounted upon the loop 8, for cooperation with said teeth 3. With the parts so arranged, the baking plate 5 is supported by the standard 1 in contact with the sandwich and there is no liability of the said plate crowding down on the sandwich and squeezing or otherwise damaging the article of food in any way. As the sandwich is toasted and possibly shrinks some, the baking plate 5 remains stationary.

Now under certain conditions, it may be desirable to remove the plate 5 entirely from the standard 1, and to do this, the handle 7 is manipulated to raise the plate, and its associated parts directly carried thereby, into a position somewhat as shown in Figure 5, wherein the ends of the pin 4 are opposite the enlargement 10 in the slot 8, whereupon by inward movement of the plate 5, it may be entirely detached from the standard 1 in a self evident manner.

Since the plate 5 is movable upwardly and has slight floating action, it will be apparent that the lead wire 15, leading from the plug 16 to the heating element of the upper plate 5 is provided to accommodate such movement and manipulation.

The up and down movement of the upper plate or platen 5 is only possible when the latter is in an angular or inclined position. The shifting of the plate 5 to a horizontal position and engagement of the locking or engaging plate 11 with the rack 1, locks the plate 5 firmly against downward displacement or movement.

Broadly my invention may obviously be characterized as a double platen baker adapted not only for use for baking sandwiches, but for many other uses as for cooking meats, etc.

Having thus described my invention, what I claim as new and desire to secure by Letters Patent of the United States, is:—

1. In a sandwich baker, in combination, a base comprising a fixed baking plate, an upper baking plate for cooperation with said fixed baking plate, and means intermediate the base and upper baking plate for supporting the latter in adjusted positions vertically spaced from the lower baking plate to contact with an article of food on the latter, and comprising a standard having teeth, the upper baking plate having a loop embracing the standard and having a hardened metal plate providing a tooth to engage the teeth of the standard.

2. In a sandwich baker of the class described, in combination, a lower baking plate, a rack carried thereby, an upper baking plate, a lug extending therefrom and having a slot therein adapted to receive the rack, and means associated with the lug and slot therein for engaging said rack said means being adjustable to compensate for wear.

3. In a sandwich baker of the class described, in combination, a lower baking plate, a rack carried thereby, an upper baking plate, means associated with the upper baking plate for receiving said rack, and an adjustable rack engaging plate associated with said means for engaging the rack.

4. In a sandwich baker of the character described, a standard, a baking plate having an opening in which the standard fits, and a pin on the standard and overlying a portion of the plate, whereby the plate may be held by the pin in tilted inoperative position on the standard.

5. In a sandwich baker of the character described, a standard, a baking plate having an opening in which the standard fits, a pin on the standard and overlying a portion of the plate, and means on the plate adapted to rest on the top of the standard while another portion of the plate engages under the pin, whereby the plate may be held in tilted inoperative position on the standard.

6. In a sandwich baker of the class described, a rack, a backing plate having an opening in which the rack is loosely received, flat rack engaging means on the plate and partially covering said opening, said means having an adjustable connection with said plate whereby said means may be shifted over said opening, said plate and means having a pin and slot device for guiding the movement of said means and securing the latter.

7. In a sandwich baker of the character described, a standard, a baking plate having an opening in which the standard fits, and a pin on the standard and overlying a portion of the plate, whereby the plate may be held by the pin in tilted inoperative position on the standard, the wall of the opening opposite the pin being slotted to permit passage therethrough of said pin, whereby said plate may be entirely removed from said standard.

8. In a sandwich baker, comprising, in combination, a base having a lower baking plate, a supporting standard projecting upwardly from the base, and an upper baking plate vertically adjustable on the said standard, the upper baking plate loosely embracing the standard to provide free movement relatively to the standard so as to enable the upper baking plate to adapt itself to an article of non-uniform thickness placed between the plates.

9. In a sandwich baker, in combination, a supporting base having a stationary baking plate thereon, a standard projecting upwardly from the base, an upper baking plate, and interengaging adjusting means between the upper baking plate and the said standard, the adjusting means loosely embracing the standard whereby the upper baking plate is enabled to adapt itself to an article of non-uniform thickness placed between the plate, the adjusting means also permitting the upper baking plate to be supported at various horizontal adjustments spaced from the lower plate.

10. In a sandwich baker, in combination, a supporting base having a stationary baking plate thereon, a standard projecting upwardly from the base, an upper baking plate, and adjustable connecting means between the upper baking plate and the said standard, the connecting means loosely embracing the standard and being such that the upper baking plate is rendered freely movable relatively to the lower plate and is enabled to adapt itself to an article of non-uniform thickness between the plate.

11. In a sandwich baker, in combination, a supporting base having a stationary baking plate thereon, a standard projecting upwardly from the base, an upper baking plate, and adjustable connecting means between the upper baking plate and the standard, the connecting means loosely embracing the standard whereby the upper baking plate is rendered freely adjustable to adapt itself to an article of non-uniform thickness being toasted thereby, the adjustable connecting means including inter-engaging parts whereby to support the upper baking plate positively in a position cooperating with an article on the lower plate so as to lie flat on the article having an unequal thickness throughout.

12. In a sandwich baker, in combination with a base and standard means projecting up from the base, the base having a lower baking plate, an upper baking plate having a handle for its manipulation and provided with means loosely embracing the standard means and engaging the latter to adjustably support the upper baking plate and to enable the upper baking plate to adapt itself to an article of non-uniform thickness, the engaging means also cooperating with the standard means to hold the upper baking plate in a manner for free, sidewise and front to rear rocking floating movement of the upper plate to adjust itself to the plane of the object being baked between the said plates.

In testimony whereof I affix my signature.

WILLIS W. HALE.